(12) United States Patent
Zientek et al.

(10) Patent No.: US 7,790,361 B2
(45) Date of Patent: Sep. 7, 2010

(54) METHODS OF PRODUCING DIFFRACTIVE STRUCTURES IN SECURITY DOCUMENTS

(75) Inventors: Paul Zientek, South Melbourne (AU); Gary Fairless Power, Greenvale (AU); Joshua Robert Nemeth, Elwood (AU)

(73) Assignee: Securency Pty. Ltd., Craigieburn, Victoria (AU)

( * ) Notice: Subject to any disclaimer, the term of this patent is extended or adjusted under 35 U.S.C. 154(b) by 728 days.

(21) Appl. No.: 11/183,249

(22) Filed: Jul. 15, 2005

(65) Prior Publication Data

US 2007/0020530 A1 Jan. 25, 2007

Related U.S. Application Data

(63) Continuation-in-part of application No. 10/019,086, filed as application No. PCT/AU00/00726 on Jun. 27, 2000, now abandoned.

(30) Foreign Application Priority Data

Jun. 28, 1999 (AU) .................................... PQ1259
Jul. 16, 2004 (AU) .............................. 2004903948

(51) Int. Cl.
*G03H 1/02* (2006.01)

(52) U.S. Cl. ............................... 430/321; 430/1; 430/2; 359/3; 283/86

(58) Field of Classification Search ....................... None
See application file for complete search history.

(56) References Cited

U.S. PATENT DOCUMENTS 3,588,439 A * 6/1971 Heller .................... 219/121.68
3,787,210 A * 1/1974 Roberts ....................... 430/256

(Continued)

FOREIGN PATENT DOCUMENTS

DE 196 42 040 10/1996

(Continued)

OTHER PUBLICATIONS

Lippert et al. "single pulse nm-size grating formation in polymers using laser ablation with an irradiation wavelength of 355 nm" Appl. Phys. Lett., vol. 75(7) pp. 1018-1020 (Aug. 1999).*

(Continued)

*Primary Examiner*—Martin J Angebranndt
(74) *Attorney, Agent, or Firm*—Andrus, Sceales, Starke & Sawall, LLP (57) ABSTRACT

Various methods of producing a security document or article including a diffractive optical microstructure are disclosed. One method includes applying an opacifying layer (102) to at least one surface of a transparent substrate (100). An area of the opacifying layer (102) is exposed to laser radiation (108) to ablate apertures (110) in selected portions of the opacifying layer (102), thereby forming a diffractive optical microstructure (112) on the surface of the substrate (100). The laser radiation may be patterned prior to exposing the opacifying layer (102), for example by passing the radiation through a mask (104). Alternatively, a focussed or collimated laser beam (206) may be directed onto the selected portions of the opacifying layer (102). Laser radiation may be directed onto the opacifying layer (102) either directly, or through the transparent substrate (100). Security documents or articles made in accordance with the method are also provided.

7 Claims, 8 Drawing Sheets

U.S. PATENT DOCUMENTS

| | | | |
|---|---|---|---|
| 4,022,324 A | | 5/1977 | Schuster |
| 4,730,729 A | | 3/1988 | Monch |
| 4,731,222 A | | 3/1988 | Kralovic et al. |
| 4,735,670 A | | 4/1988 | Maurer et al. |
| 4,856,857 A | | 8/1989 | Takeuchi et al. |
| 5,087,510 A | * | 2/1992 | Tokas et al. ............... 428/209 |
| 5,093,184 A | | 3/1992 | Edwards ............... 428/195.1 |
| 5,222,600 A | | 6/1993 | Stoddard et al. |
| 5,228,460 A | | 7/1993 | Sprinkel et al. |
| 5,329,152 A | * | 7/1994 | Janai et al. ............... 257/529 |
| 5,331,443 A | | 7/1994 | Stanisci |
| 5,340,637 A | | 8/1994 | Okai et al. |
| 5,351,142 A | | 9/1994 | Cueli |
| 5,384,221 A | | 1/1995 | Savant et al. |
| 5,389,698 A | | 2/1995 | Chigrinov et al. |
| 5,534,221 A | | 7/1996 | Hillebrenner et al. |
| 5,549,774 A | * | 8/1996 | Miekka et al. ............... 156/209 |
| 5,602,661 A | | 2/1997 | Schadt et al. |
| 5,620,656 A | | 4/1997 | Wensky et al. |
| 5,730,530 A | | 3/1998 | Stoddard et al. |
| 5,757,016 A | * | 5/1998 | Dunn et al. ............... 250/492.1 |
| 5,757,521 A | * | 5/1998 | Walters et al. ............... 359/2 |
| 5,759,741 A | * | 6/1998 | Pearce et al. ............... 430/271.1 |
| 5,801,857 A | | 9/1998 | Heckenkamp et al. |
| 5,815,292 A | | 9/1998 | Walters |
| 6,144,428 A | | 11/2000 | Schadt et al. |
| 6,160,597 A | | 12/2000 | Schadt et al. |
| 6,222,157 B1 | * | 4/2001 | Langille et al. ............... 219/121.69 |
| 6,505,779 B1 | | 1/2003 | Power et al. |
| 2002/0068224 A1 | * | 6/2002 | Danda et al. ............... 430/1 |
| 2003/0010763 A1 | * | 1/2003 | Fukuchi et al. ............... 219/121.73 |
| 2007/0278785 A1 | * | 12/2007 | Nemeth et al. ............... 283/78 |

FOREIGN PATENT DOCUMENTS

| | | |
|---|---|---|
| DE | 298 05 481 | 9/1998 |
| DE | 19713218 * | 10/1998 |
| EP | 0 318 770 | 6/1989 |
| EP | 0 628 431 | 11/1989 |
| EP | 0737902 | 3/1996 |
| EP | 0 756 193 | 1/1997 |
| EP | 0 611 981 | 6/1997 |
| EP | 0 525 477 | 9/1998 |
| EP | 0 892 362 | 1/1999 |
| EP | 0 689 065 | 6/2001 |
| EP | 1 310 838 | 5/2003 |
| EP | 0 689 084 | 6/2003 |
| GB | 2 222 696 | 3/1990 |
| JP | 62-111276 | 5/1987 |
| JP | 05-050936 | 2/1993 |
| JP | 06-051683 | 2/1994 |
| JP | 10-113780 | 5/1998 |
| JP | 10-319221 | 12/1998 |
| WO | WO-95/26274 | 10/1995 |
| WO | WO-98/36913 | 8/1998 |
| WO | WO-98/52077 | 11/1998 |
| WO | WO-01/00418 | 1/2001 |
| WO | WO-01/53115 | 7/2001 |

OTHER PUBLICATIONS

Karnikis et al. "Laser induced molecular transfer using ablation of a triazeno-polymer", Appl. Surf. Sci, vol. 127-129 pp. 781-786 (1998).*

Wang et al. "Rapid fabrication of diffraction optical elements byuse of image-based excimer laser ablation", Appl. Opt. vol. 36(20) pp. 4660-4665 (Jul. 1997).*

Ilcisin et al. "Direct production of gratings on plastic substrates using 248 nm KrF laser radation", Appl. Opt., vol. 26(2) pp. 396-400 (Jan. 1987).*

"Phase grating blakc for the fabrication of ablation masks" IBM TEch. Discl. Bull. vol. 39(5) pp. 249-252 (May 1996).*

Kress et al., Digital Diffractive Optics, pp. 74-77 (2000).

Derwent Abstract Accession No. 2000-228568/20, Class P76; V07, JP2000047556A (Dainippon Printing Co. Ltd.) Feb. 18, 2000.

Derwent Abstract Accession No. 2000-228567/20, Class P76; V07, JP 2000047555A (Dainippon Printing Co., Ltd.) Feb. 18, 2000.

Derwent Abstract Accession No. 2003-009148/01, Class P76, JP 2002321476A (Toppan Moore KK) Nov. 5, 2002.

Dement Abstract Accession No. 40101 E/20, Class A89 G06 P75, JP 57-058251 A (Tokyo Shibaura Elec. Ltd.) Apr. 7, 1982.

Derwent Abstract Accession No. 1999-236207, Class B23 K26 00, JP 11064614 A (Ricoh KK) Mar. 5, 1999.

Holographic Diffraction Gratings Recorded in Photoresist, G. W. Grime, Non-silver Photographic Processes, pp. 275-285.

* cited by examiner

METHODS OF PRODUCING DIFFRACTIVE STRUCTURES IN SECURITY DOCUMENTS

CROSS REFERENCE TO RELATED APPLICATION

The present application is a continuation-in-part application of U.S. patent application Ser. No. 10/019,086, filed Apr. 9, 2002, now abandoned which application is the U.S. national stage application of International Application No. PCT/AU00/00726, filed Jun. 27, 2000. The International Application was published on Jan. 4, 2001 as International Publication WO 01/00418 in the English language. The International Application claims the priority of Australian Patent Application No. PQ 1259, filed Jun. 28, 1999. This application also claims priority of Australian Provisional Application No. 2004903948, filed Jul. 16, 2004.

BACKGROUND OF THE INVENTION

The present invention relates generally to methods of producing a security document or device, and in particular to security documents or device which include an optically diffractive structure, such as a diffraction grating or like device. The invention is applicable to the production of banknotes, and it will be convenient to hereinafter describe the invention in relation to that exemplary application. It is to be appreciated, however, that the invention is not to be limited to that application.

The practice of applying diffraction gratings and like optically detectable diffractive and other structures to security documents and devices, such as credit cards, bank notes and cheques, has become widely adopted. Currently, diffraction gratings and other structures are produced in multi-layer thin films supported on thin carrier structures. The structures are then transferred from the thin film carrier substrate to the security document or device, typically by using a hot-stamping process. Reflective optical diffraction devices conventionally contain an ultra-thin vacuum metallised reflective layer, usually aluminium, adjacent to the diffractive structure within the multi-layer structure.

A number of disadvantages are associated with the production and application of optically diffractive and other devices in this manner. Firstly, the complex and highly specialised process required to produce the multi-layer optically diffractive device structure, which may contain at least four and frequently more layers, is costly. Secondly, an extra process step is required to transfer the optically diffractive device from the carrier substrate onto the security document or device. Thirdly, the resistance of the optically diffractive device as a whole to physical wear and tear and chemical attack is poor due to the weakness of the vacuum metallised reflective layer.

SUMMARY OF THE INVENTION

An aim of the present invention is to alleviate or overcome one or more of the disadvantages of known methods for producing security documents or devices including optically diffractive devices.

According to one aspect the present invention provides a method of producing a security document or device comprising a substrate and a detectable security device, the method comprising the step of:

irradiating an area of a surface on one side of the substrate with laser radiation to ablate selected portions of the surface and thereby form an optically diffractive structure in said one surface, wherein the laser radiation is a patterned laser beam bearing the pattern of the desired diffractive device.

The present invention is particularly applicable to the formation of diffractive microstructures known as numerical-type (DOEs). The simplest numerical diffractive optical elements (DOEs) rely on the mapping of complex data that reconstruct in the far field (or reconstruction plane) a two-dimensional intensity pattern. Thus when substantially collimated light, eg from a point light source or a laser, is incident upon the DOE, an interference pattern is generated that produces a projected image in the reconstruction plane that is visible when a suitable viewing surface is located in the reconstruction plane or when the DOE is viewed in transmission at the reconstruction plane. The transformation between the two planes can be approximated by a fast Fourier transform (FFT). Thus, complex data including amplitude and phase information has to be physically encoded in the microstructure of the DOE. This DOE data can be calculated by performing an inverse FFT transformation of the desired reconstruction (ie the desired intensity pattern in the far field).

The present invention significantly simplifies the multilayered structure of a security device when incorporated into the security document or device. The application of an optically diffractive device may be easily integrated into the process of manufacture of the security document or device. Moreover, in those cases in which reflective optically diffractive devices are used, it is possible to eliminate the use of a brittle metallised coating.

The method of producing a security document or device may further comprise the step of placing a mask in the path of the laser radiation to create said patterned laser radiation. Preferably, the mask is encoded with the complex data required to form the numerical-type DOE.

Conveniently, the substrate may be formed from a transparent plastics film. The transparent plastics film may be formed from polymeric material. The substrate may also be formed from paper, paper/polymer composites, coated paper and other non-transparent substrates in those cases where reflective patterns are used.

In one embodiment, the substrate may further comprise a transparent coating applied to the transparent plastics film, the optically diffractive structure being formed from a polymeric material.

The substrate may further comprise a reflective coating applied to the transparent coating. The reflective coating may be formed from polymeric material and may contain metallic pigment particles.

Conveniently, both the reflective coating and the transparent coating may be formed from material which is similarly resistant to physical degradation, such as by chemical attack.

In another embodiment, the substrate may further comprise a transparent layer applied to the transparent coating. The transparent layer may be formed from polymeric material. Conveniently, both the transparent layer and the transparent coating ay be formed from material which is similarly resistant to physical degradation, for example by chemical means.

In a still further embodiment, this substrate may further comprise a reflective coating applied to the transparent plastics film, said optically diffractive structure being formed in the reflective coating. The reflective coating may be formed from polymeric material and may contain metallic pigment particles.

The substrate may further comprise a transparent coating applied to the reflective coating. The transparent coating may be formed from a polymeric material. The substrate may also be formed from paper, paper/polymer composites, coated paper and other non-transparent substrates in those cases where reflective diffractive structures are used. Both the reflective coating and the transparent coating may be made of material which is similarly resistant to physical degradation, for example, by chemical means.

The method of producing a security document or device may further comprise the step of applying at least one opacifying layer to the substrate, said at least one opacifying layer only partly covering a surface of the substrate to leave at least said optically diffractive device uncovered by said opacifying layer.

In another embodiment, the substrate includes an opacifying layer applied to the transparent plastics film and an area of the opacifying layer is exposed to the patterned laser beam to ablate apertures in selected portions of the opacifying layer and thereby form said optically diffraction structure in said opacifying layer.

In a further aspect, the present invention provides a method of producing a security document or article including a substrate transparent at least to visible light and a diffractive optical microstructure, including the steps of:

applying an opacifying layer to at least one surface of the transparent substrate; and exposing an area of the opacifying layer to laser radiation to ablate apertures in selected portions of the opacifying layer and thereby to form a diffractive optical microstructure on said surface of the substrate.

Since the diffractive optical microstructure is formed through the contrast between the ablated portions and the adjacent opaque regions, it will not be destroyed even when coated by, or filled with, a coating or laminate having a similar refractive index to that of the substrate.

Furthermore, the image is not directly visible by inspection of the diffractive optical microstructure when viewed in reflection from the front or reverse side of the document. Accordingly, a diffractive optical microstructure formed in accordance with the invention exhibits the desirable property of previously known diffractive optical structures of being difficult to falsify or modify in an undetectable manner.

The step of exposing the opacifying layer to laser radiation may include irradiating the opacifying layer with a patterned laser beam bearing a pattern corresponding with the diffractive optical microstructure. A mask may be placed in the path of the laser radiation to create said patterned laser beam. Preferably, the mask has apertures formed therein such that the laser radiation passes through said apertures to form a patterned laser beam bearing the pattern of the desired diffractive structure.

Accordingly, a single mask may be provided for use in the production of security documents or similar articles that results in the rapid and repeatable generation of a fixed diffractive structure in the articles produced. The mask may be manufactured such that the diffractive structure generates any desired image, such as an image individual to, or distinctive of, a producer or issuer of a security document. The resulting diffractive structure may then be used, for example, to authenticate security documents originating from a particular source.

Alternatively, the step of exposing an area of the opacifying layer to laser radiation may include using a scribe laser, whereby a laser beam is directed onto the selected portions of the opacifying layer to form apertures in said portions by ablation.

The scribe laser may be computer controlled to produce individual diffractive structures which may be used, for example, to produce personalised documents wherein a unique structure may be used to authenticate a document as belonging to a particular individual. The image generated by the diffractive structure may be a biometric image, such as a photograph or fingerprint of an owner or authorised holder of a security document or other article.

It is preferred that the substrate be formed of at least one transparent plastics material, more preferably a transparent polymeric material, such as polyethylene (PE), polypropylene (PP) or polyethylene terephtalate (PET), which may be made up of at least one biaxially-oriented polymeric film. The substrate may include a single layer film of polymeric material, or alternatively may include a laminate of two or more layers of transparent polymeric film.

The opacifying layer is preferably a coloured or pigmented layer which may include any one or more of a variety of opacifying inks which can be used in the printing of security documents and similar articles. For example, the opacifying inks may include pigmented coatings that include a pigment, such as titanium dioxide, dispersed within a binder or carrier of heat activated cross-linkable polymeric material.

The opacifying layer is preferably a stronger absorber of laser radiation than the substrate. The wavelength of the laser radiation may be selected such that when the article is exposed to the radiation, the selected portions of the opacifying layers absorb the radiation and are ablated from the substrate, the substrate being substantially transparent to the radiation at the selected wavelength so that the laser radiation travels through the substrate without significant absorption. Accordingly, the opacifying layer may be ablated by the laser radiation without damage to the substrate.

The laser radiation may be a continuous beam. Alternatively, it may be emitted as a pulse or series of pulses.

In a preferred embodiment, the laser radiation is directed onto the opacifying layer from the side of the substrate opposed to the side upon which the opacifying layer is applied, such that the laser radiation passes through the substrate and ablates the selected portion of the opacifying layer.

In a particularly preferred embodiment, the substrate is formed of biaxially oriented polypropylene (BOPP), and the wavelength of the laser radiation used is approximately 248 nm.

The method may include the further step, after forming the diffractive optical microstructure, of applying additional layers to the transparent substrate to produce the finished security document or article. For example, a clear protective varnish may be applied that covers at least the diffractive optical microstructure. Alternatively or additionally, clear laminating layers may be applied to one or both sides of the substrate. Further transparent supporting layers may also be applied in order to produce the finished security document or other article.

In another aspect, the present invention provides a security document or article including:
  a substrate transparent at least to visible light; and
  a transmissive diffractive optical microstructure formed in an opacifying layer applied to at least one surface by the substrate by ablating apertures in selected portions of the opacifying layer by exposure to laser radiation.

According to a further aspect of the invention, there is provided a method of producing a security document or article including a substrate transparent at least to visible light and a diffractive optical microstructure, including the steps of:
  applying an opacifying layer to a surface on one side of the substrate; and
  directing laser radiation onto said opacifying layer from the opposite side of the substrate;

wherein the substrate is substantially transparent to the laser radiation so that the laser radiation travels through the substrate without substantially affecting the substrate and selected portions of the opacifying layer are ablated by the laser radiation to form a diffractive optical microstructure in the opacifying layer.

In this aspect of the invention, the selected portions of the opacifying layer which are ablated by the laser radiation may not extend completely through the opacifying layer. In this manner, it is possible to form a reflective diffractive optical microstructure, eg a hologram, in the surface of the opacifying layer. However, because the microstructure is formed in the surface of the opacifying layer adjacent to the transparent substrate, the diffractive optical effects produced by the microstructure are substantially unaffected by subsequent application of a coating or laminate over the opacifying layer.

In a still further aspect of the invention there is provided a security document or article including a diffractive optical microstructure made by the method of any of the previous aspects.

The following description refers in more detail to the various features of the method for producing a security document or device according to the present invention. To facilitate an understanding of the invention, reference is made in the description to the accompanying drawings wherein the invention is illustrated in a number of preferred embodiments. It is to be understood, however, that the invention is not limited to the preferred embodiments as illustrated in the drawings.

DETAILED DESCRIPTION OF THE INVENTION

Figure 1:
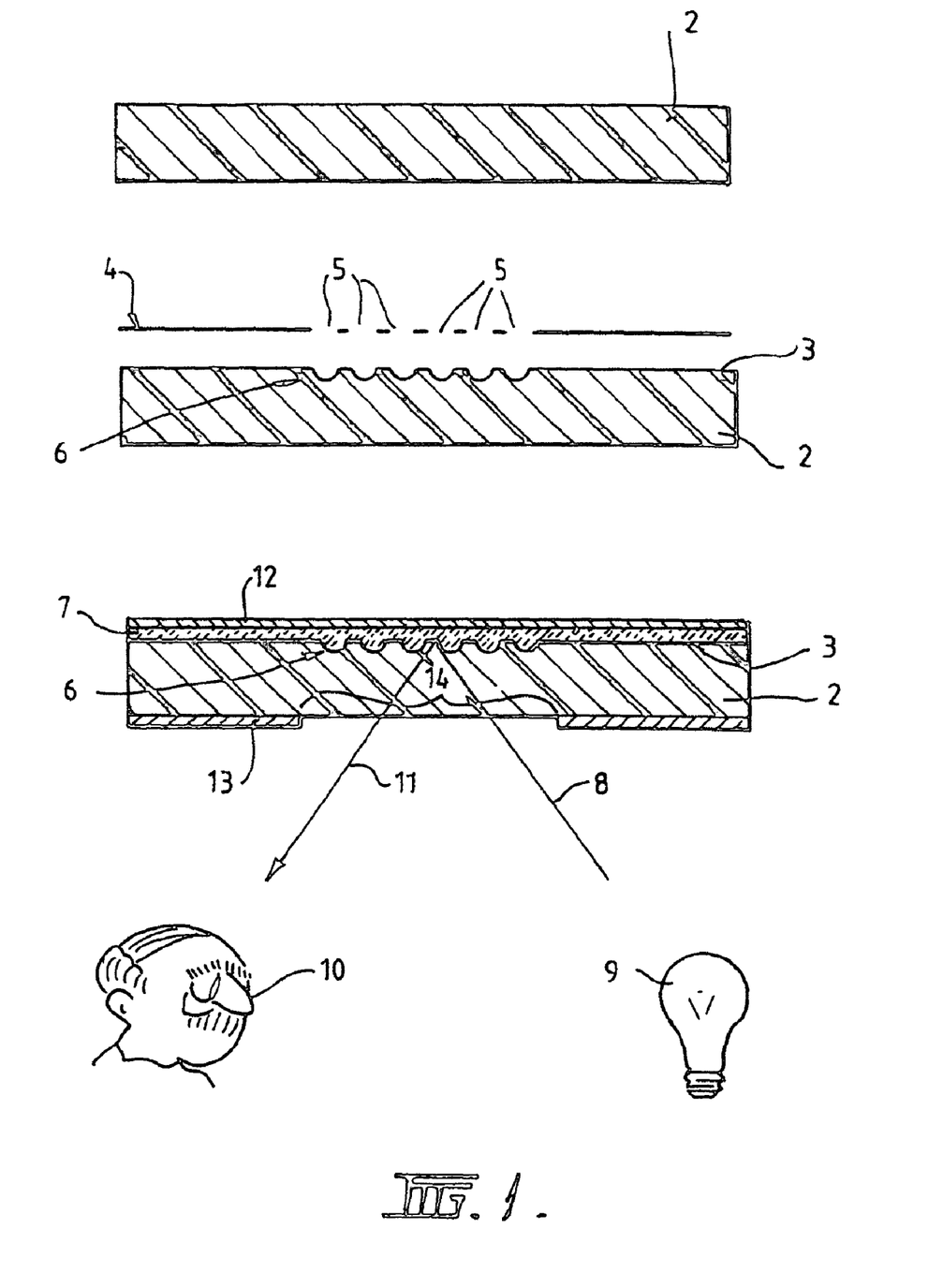
FIG. 1 is a schematic diagram illustrating steps involved in the method for producing a first embodiment of a security document including a reflective diffractive structure according to the present invention.

Referring now to FIG. 1, there is shown a transparent plastics film 2 formed from polymeric material, used in the manufacture of polymer banknotes. The substrate 2 may be made from at least one biaxially oriented polymeric film. The substrate may comprise a single layer of film of polymeric material, or, alternative, a laminate of two or more layers of transparent biaxially oriented polymeric film. The substrate 2 is seen in cross section in FIG. 1. Whilst the invention will be described with reference to FIGS. 1 to 6 in relation to the production of polymer banknotes, it is to be appreciated that the invention may also be used in the production of credit cards, cheques and other security documents or devices, and that the function and properties of the substrate in those security documents or devices may vary.

In this example, a diffraction grating or other optically diffractive device is formed on one surface 3 of the substrate 2 by irradiating an area of that surface with patterned laser radiation. The patterning of the laser radiation incident on the one surface 3 of the substrate 2, may result from the placement of a mask in the path of the laser radiation. The mask 4 may have apertures 5 formed therein such that in those areas where the laser radiation passes through the mask, the light interacts with the surface layer of the substrate 2 in which the diffraction grating is to be created, causing material to be ablated or otherwise removed to an appropriate depth in the surface layer of the substrate 2, and resulting in a three dimensional optically diffractive structure 6.

A reflective coating 7 is then applied to the ablated surface of the substrate 2. The reflective coating 7 may be a coated polymer layer, containing, for example, metallic pigment particles, or reflective particles, to perform a reflective function. The reflective layer 7 may be applied by conventional printing methods, and may fill the three dimensional structures formed by the laser ablation of the surface 3 of the substrate 2. The coated polymer layer 7 acts as a binding matrix to hold the reflective particles, and provides the strength and flexibility required for the reflective layer to resist physical wear and tear, while the pigment particles may be formed from a material which is resistant to chemical attack.

When incident light 8 from a light source 9 is reflected to a user 10 the reflected light 11 is observed as being diffracted.

Opacifying layers 12 and 13 may be applied to one or more opposing faces of the coated substrate. The opacifying layers 12 and 13 may comprise any one or more of a variety of opacifying inks which can be used in the printing of banknotes or other security documents. For example, the layers of opacifying ink may comprise pigmented coatings comprising a pigment, such a titanium dioxide, dispersed within a binder or carrier of heat activated cross linkable polymeric material. Alternatively, the coated substrate may be sandwiched between opacifying layers of paper.

In order to view the diffractive effect caused by the optically diffractive device, at least a first region of a surface of the substrate 2 may be left uncovered by the opacifying layers.

Figure 2:
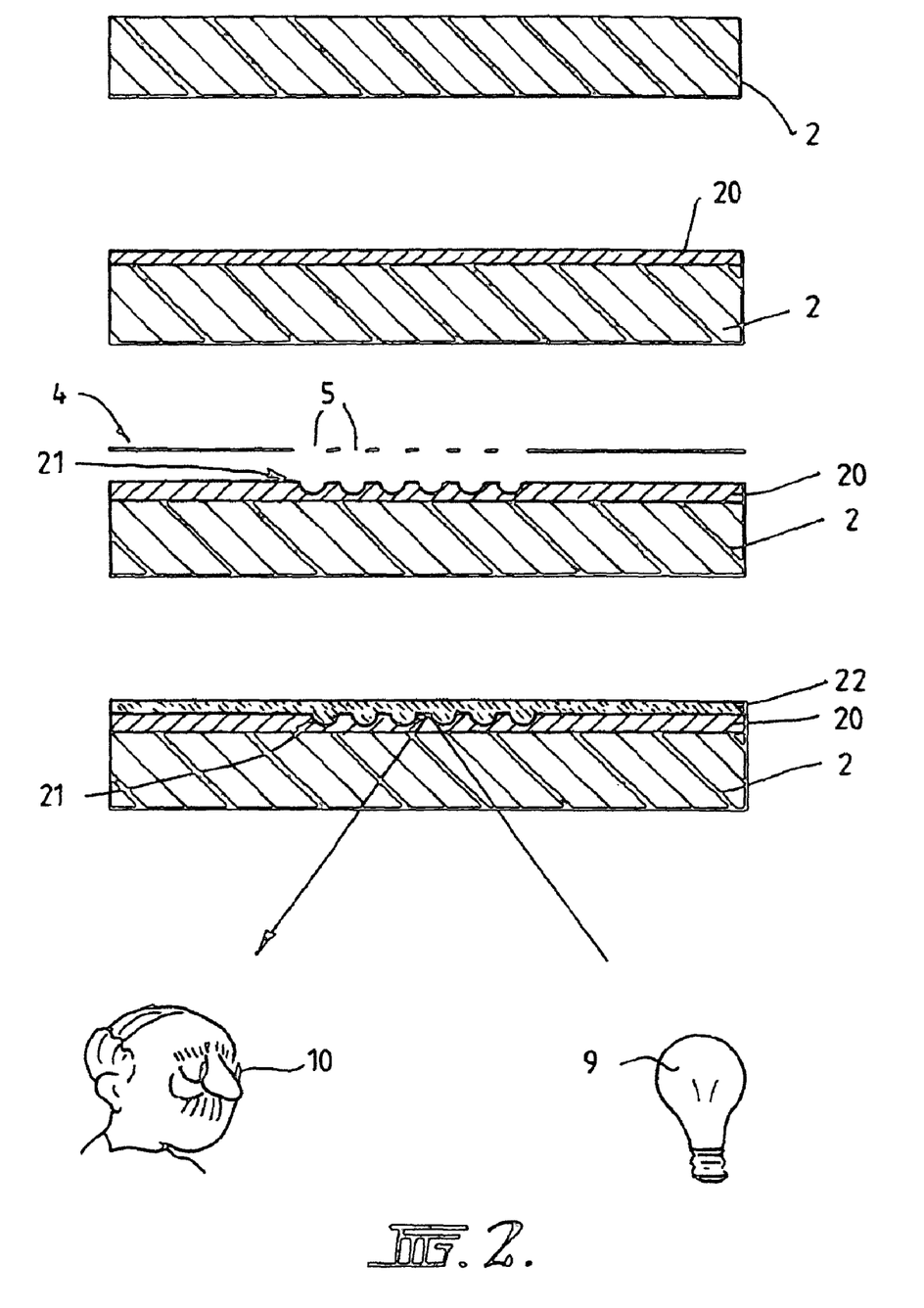
FIG. 2 is a schematic diagram illustrating steps involved in the production of a second embodiment of a security document including a reflective diffractive structure according to the present invention.

FIG. 2 illustrates a first variation of the method for producing a security document or device according to the invention. In this figure the substrate 2 is initially coated with a transparent coating 20. The transparent coating 20 may be formed from a polymeric material.

Laser radiation, patterned by a mask 4, is then used to ablate selected portions of transparent coating 20, and to form therein a three dimensional optically diffractive structure 21. A reflective coating, identical to the reflective coating 7 applied to the substrate 2 in FIG. 1, is then applied by conventional printing methods to the transparent coating 20.

Both the transparent coating 20 and the reflective coating 22 may be formed from coated polymer material or other like material which is similarly resistant to physical degradation, such as by chemical attack. In this way, a counterfeiter wishing to recover the optically diffractive device by desolving or chemically etching the reflective layer 22, would also cause the desolving or chemical etching of the transparent coating 20 and the optically diffractive structure formed therein.

Once again, opacifying coatings may be applied to one or both surfaces of the coated substrate structure 2, 20, 22.

Figure 3:
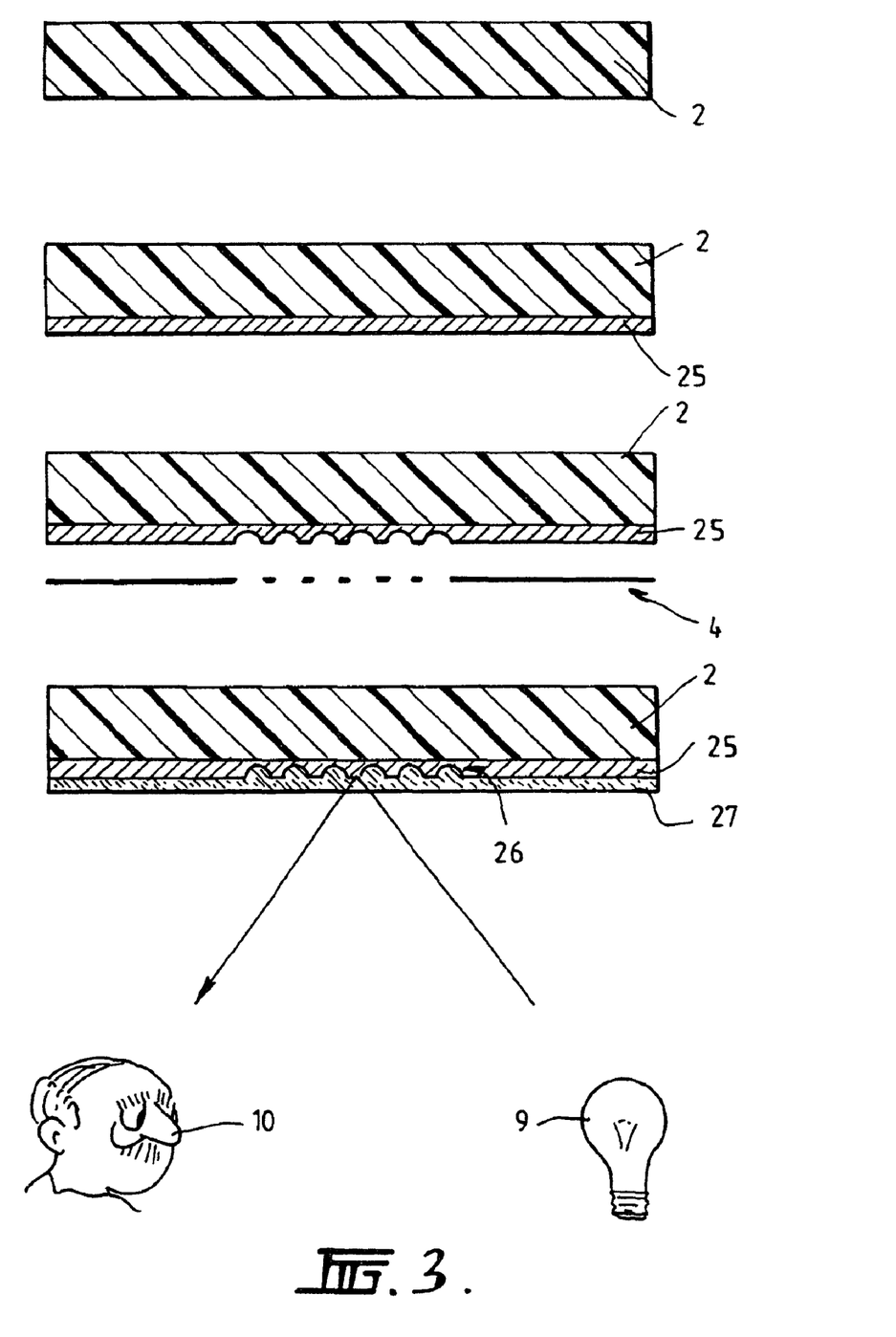
FIG. 3 is a schematic diagram illustrating steps involved in the production of a third embodiment of a security document including a reflective diffractive structure according to the present invention.

A second variant of the method illustrated in FIG. 1 is shown in FIG. 3. In this figure, one surface of the substrate 2 is firstly coated with a reflective coating 25, identical to the reflective layer 7 in FIG. 1. Laser radiation is then patterned by a mask 4 to ablate material from the reflective coating 25 to thus form a three dimensional optically diffractive structure 26 in the reflective coating 25.

Subsequently, a transparent coating 27 is applied to the reflective coating 25. The transparent coating 27 may fill the three dimensional structure formed in the reflective layer 25. Once again, the reflective coating 25 and the transparent coating 27 may be made from material which is similarly resistant to chemical attack or other physical degradation, in order to prevent the optically diffractive structure 26 from being recovered by a counterfeiter.

Figure 4:
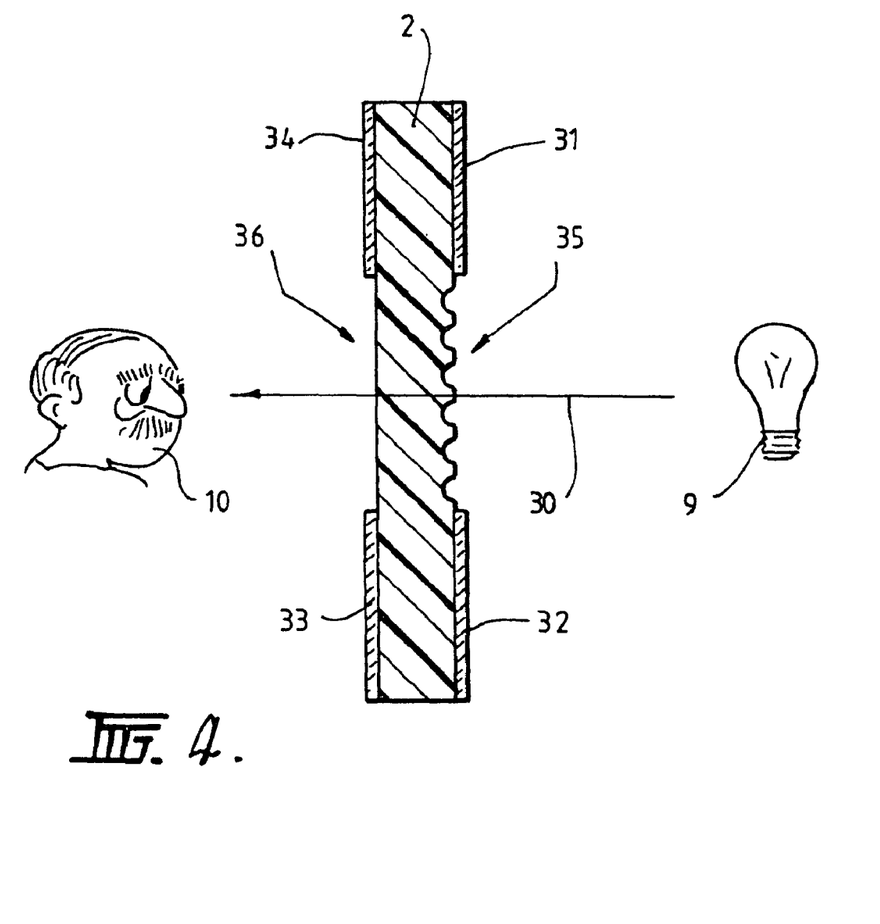
FIG. 4 is a schematic diagram illustrating steps involved in the production of a first embodiment of a security document including a transmission diffractive structure according to the present invention.
Figure 5:
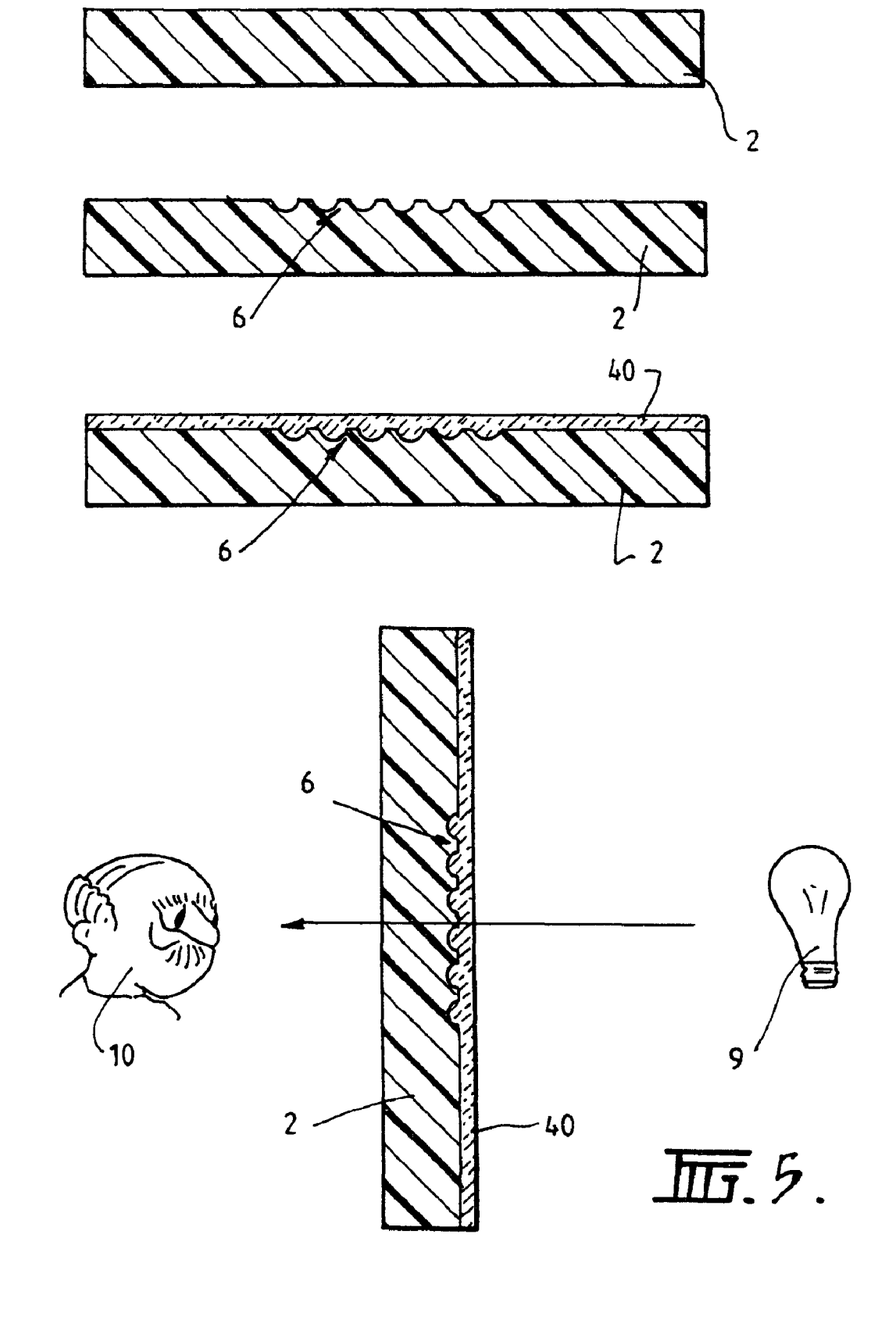
FIG. 5 is a schematic diagram illustrating steps involved in the production of a second embodiment of a security document including a transmission diffractive structure according to the present invention.
Figure 6:
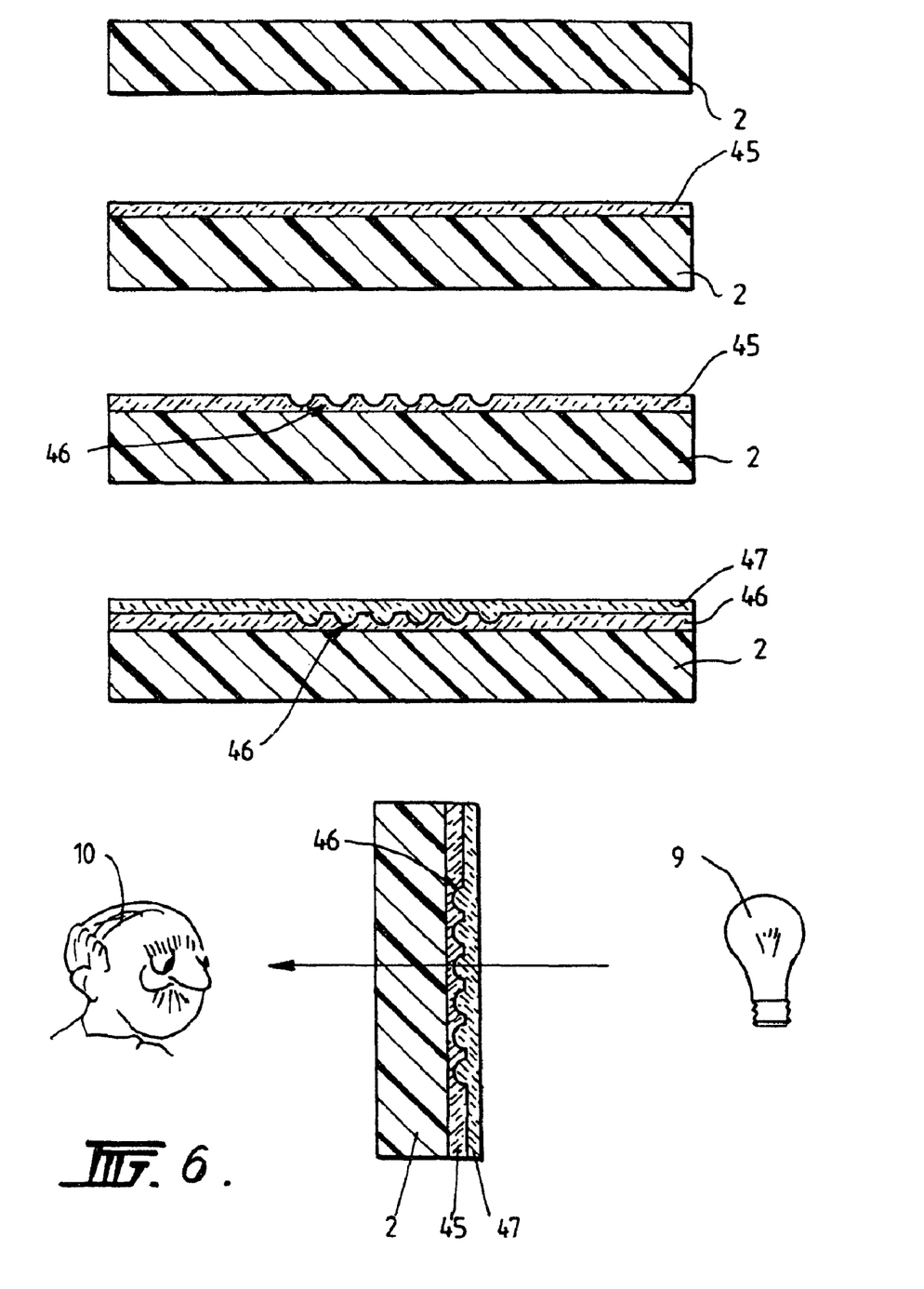
FIG. 6 is a schematic diagram illustrating steps involved in the production of a third embodiment of a security document including a transmission diffractive structure according to the present invention.

Whilst FIGS. 1 to 3 illustrate examples of a method of producing a security document including a reflective diffractive device, FIGS. 4 to 6 provide examples of a method of producing a security document including a transmissive diffractive device. In FIG. 4, one surface of the transparent polymeric film 2 is ablated by laser radiation passing through a mask 4, to form therein the same optically diffractive device 6 illustrated in FIG. 1. However, in this example, no reflective layer is subsequently applied to the surface of the substrate so that a diffraction effect is observed by the user 10 when light 30 from the light source 9 is transmitted through the substrate 2.

As in previous examples, opacifying coatings 31 to 34 may be applied to opposing surfaces of the substrate 2, leaving uncovered regions or zones 35 and 36 to enable the light 30 to be transmitted through the optically diffractive structure formed in the substrate 2.

In a first variation of this method, as illustrated in FIG. 5, an optically diffractive device 6 is once again ablated into a surface of the transparent substrate film 2. Subsequently, a clear coating layer 40 of different refractive index to the substrate film 2, is applied to the surface of the substrate 2. The transparent coating 40, as in previous examples, fills the three dimensional diffractive device 6, and prevents wearing of optically diffractive structure. The diffraction effect produced by the structure 6 may once again be observed in light transmitted through the substrate and transparent coating.

In FIG. 6, there is illustrated a second variation of the method for producing a security document including a transmission diffractive structure. In this figure, the transparent plastics substrate 2 is firstly coated with a clear coating 45 formed from a transparent polymeric material. A diffractive structure 46 is ablated into the clear coating 45 by means of incident patterned laser radiation. A transparent layer 47 is then coated onto the transparent coating 45 filling the diffractive structure 46 formed therein. The transparent layer 47 and the transparent coating 45 are formed from materials having different refractive indices, in order that a diffraction effect may be observed when light is transmitted through the security device. Where the method does not include transparent layer 47, the resulting document still functions as described above.

It will be appreciated that the methods described in FIGS. 1 to 6 may be easily integrated into the normal multi-step process during which a substrate is coated or otherwise treated, to produce a security document or device the laser process merely being integrated into this multi-step process. This method, and the security document or device including an optically diffractive device produced by this method, eliminate the need for a separate manufacturing process to produce an optically diffractive device transfer foil and the separate hot stamp foil transfer process to transfer that diffractive device transfer foil to the product.

The method according to the present invention is capable of producing either reflective or transmissive optically diffractive devices, such as reflective optically variable devices or a transmission hologram. More particularly, the present invention is particularly applicable to the formation of diffractive microstructures of the kind known as numerical-type diffractive optical elements (DOEs). When such DOEs are illuminated with substantially collimated light, eg from a point light source or a laser, an interference pattern is generated that produces a projected image in a reconstruction plane remote from the diffractive optical element. The projected image may be viewed when a suitable viewing surface or detector is located in the reconstruction plane or when the DOE is viewed in transmission at the reconstruction plane. In order to produce the projected image, complex data including amplitude and phase information has to be physically encoded in the microstructure of the DOE, and the use of a patterned laser beam, eg produced by a mask encoded with the complex data required to form the DOE is particularly suited for the manufacture of numerical-type DOEs in a security document or device.

Figure 7:
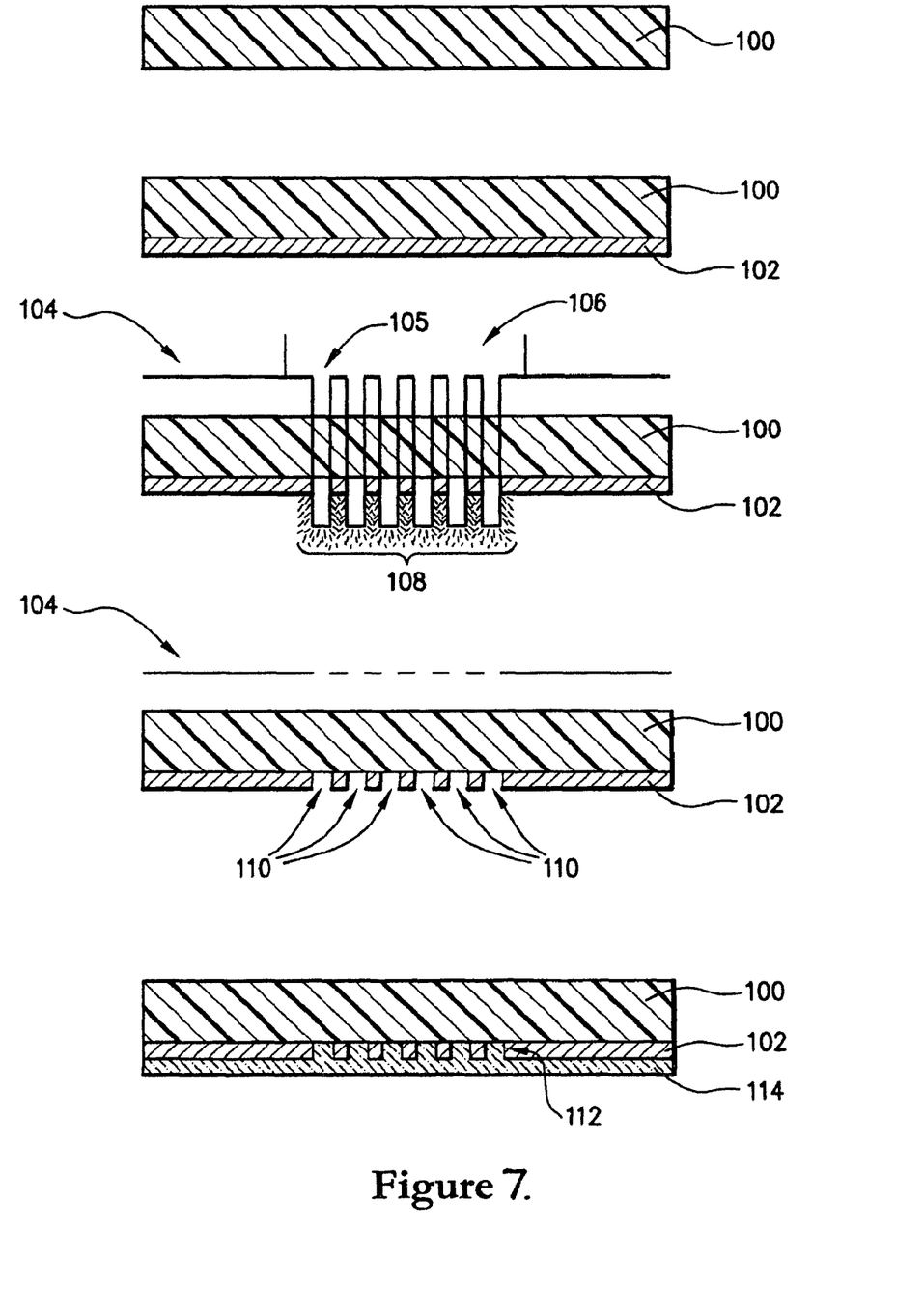
FIG. 7 is a schematic diagram illustrating steps involved in the method of producing a diffractive optical microstructure in a security document according to a first embodiment of the present invention.

Referring to FIG. 7, there is shown a transparent plastics film 100 formed from polymeric material, used in the manufacture of a security document, or similar article, such as an identity card. The substrate 100 may be made from at least one biaxially oriented polymeric film. The substrate 100 may include or consist of a single layer of film of polymeric material, or, alternatively, a laminate of two or more layers of transparent biaxially oriented polymeric film. The substrate 100 is shown in cross section in FIG. 7.

An opacifying layer 102 is applied to one surface of substrate 100. The opacifying layer 102 may include any one or more of a variety of opacifying inks suitable for use in the printing of security documents formed from polymeric materials. For example, the layer of opacifying ink 102 may include pigmented coatings having a pigment, such as titanium dioxide, disbursed within a binder or carrier of heat activated cross-linkable polymeric material.

Laser radiation, in the form of laser beam 106, is then directed onto mask 104 that is interposed in the path of the laser radiation. Mask 104 has apertures, eg 105, through which the laser radiation passes. The passing of the laser radiation through the apertures of the mask 104 results in the formation of a patterned laser beam 108 which bears a pattern corresponding with the desired diffractive structure in accordance with the mask 104.

In accordance with the preferred embodiment of the invention illustrated in FIG. 7, the patterned laser beam 108 passes through transparent substrate 100 and irradiates opacifying layer 102. The wavelength of the laser radiation, and the polymeric material used to form substrate 100, are selected such that the substrate 100 is substantially transparent to the laser radiation. Accordingly, the patterned laser beam 108 is able to pass through substrate 100 with little or no absorption of the radiation, and therefore little or no heat build up and subsequent damage to the substrate, to impinge upon opacifying layer 102. In the preferred embodiment, the substrate is formed of biaxially oriented polypropylene (BOPP) and the wavelength of the laser radiation used is approximately 248 nm, derived from an excimer laser source.

The opacifying layer 102 is a relatively strong absorber of laser radiation at the selected wavelength, and therefore the patterned laser radiation is absorbed in opacifying layer 102, resulting in particles of opacifying layer 102 being ablated in accordance with the pattern of laser beam 108 to form apertures 110 in the opacifying layer.

The apertures 110 form a microstructure having optically diffractive properties. Visible light emitted from point source on one side of opacifying layer 102 will pass through apertures 110, but be blocked by the remaining, unablated, opacifying ink. A diffraction pattern will thus be formed in the transmitted light, which will form an image when projected onto a suitable screen or other viewing surface. The image formed is determined by the pattern of ablated portions 110, which is in turn determined by the pattern of apertures in mask 104. Accordingly, by forming an appropriate mask, a diffractive structure 112 may be created corresponding to any desired image. Use of the same mask will always result in the formation of a diffractive structure corresponding to the same projected image. The image may therefore be, for example, an image individual to, or distinctive of, a producer or issuer of a security document such as an identity card. The formation of diffractive structure 112 thereby provides a means to authenticate a document as originating from a particular source, such as an authorised issuer of identity cards.

Subsequent to forming the diffractive optical structure 112, a further protective layer 114 may be applied over the structure. The protective layer may be, for example, a protective varnish coating, or a further transparent laminate. The protective layer 114 will fill the ablated regions 110 in the opacifying layer 102, however since the diffractive optical structure 112 relies upon transmission of light through the ablated portions rather than on a change in refractive index, such filling of the ablated regions does not result in the destruction of the diffractive microstructure.

Figure 8:
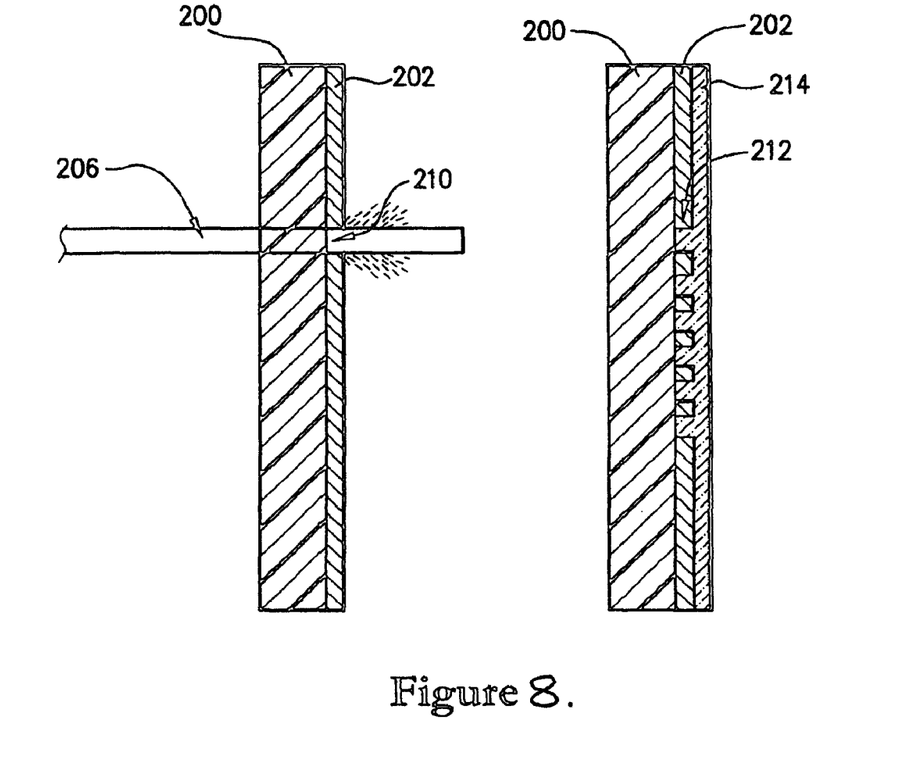
FIG. 8 is a schematic diagram illustrating steps involved in the method of producing a diffractive optical microstructure in a security document according to an alternative embodiment of the present invention.

Turning now to FIG. 8, there is shown an alternative embodiment of the invention, in which transparent plastics film 200 formed from polymeric material has been coated with opacifying layer 202. Focussed or collimated laser beam 206 is directed onto opacifying layer 202 through transparent substrate 200. By the same processes previously described with reference to FIG. 7, laser beam 206 passes through transparent substrate 200 and impinges upon opacifying layer 202 causing ablation of the opacifying layer to remove a selected portion 210.

Laser beam 206 is preferably emitted from a scribe laser (not shown), which may be controlled to inscribe any desired pattern of ablated regions in opacifying layer 202. Accordingly, the scribe laser may be controlled so as to produce any desired diffractive microstructure 212 in opacifying layer 202.

Through the use of a scribe laser, an individual diffractive structure 212 may be formed in opacifying layer 202. In accordance with this embodiment of the invention, therefore, personalised security documents, such as identification cards, may be produced that are unique to a particular individual. For example, laser beam 206 may be controlled so as to produce a diffractive structure 212 that generates a biometric image specific to a particular individual. The image may be, for example, a photograph or fingerprint of an owner or authorised holder of a security document, such as an identity card.

Again, a further protective layer 214 may be applied over the diffractive microstructure 212, filling the ablated regions, without destroying the diffractive properties of the structure.

Figure 9:
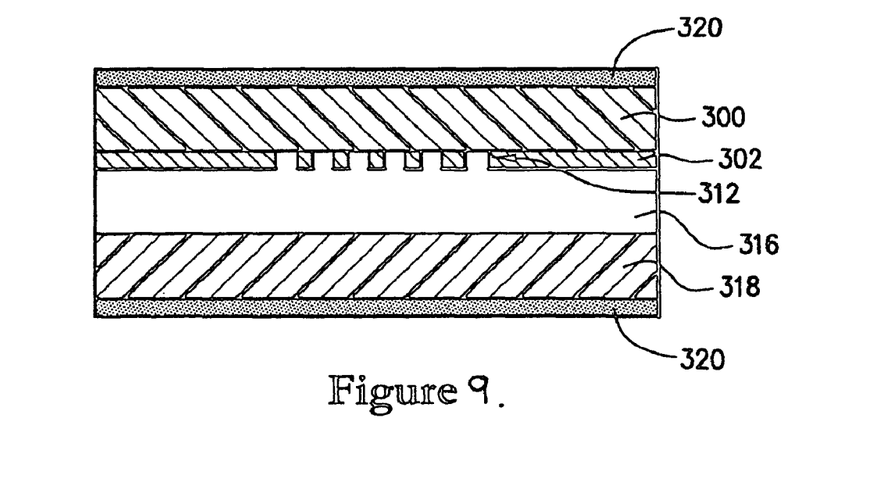
FIG. 9 is a schematic diagram illustrating a security document including a diffractive optical microstructure in accordance with an embodiment of the present invention.

FIG. 9 illustrates schematically, in cross-section, one embodiment of a completed security document made in accordance with the method of the invention. In producing the completed article, transparent substrate 300, preferably formed from biaxially oriented polypropylene (BOPP) is coated with opacifying layer 302, and diffractive microstructure 312 ablated from the opacifying layer in accordance with an embodiment of the method of the invention as described with reference to FIG. 7 or FIG. 8.

Once the optically diffractive structure 312 has been produced, further layers may be applied in order to complete the article. In the embodiment shown in FIG. 9, a further supporting layer 316 has been applied. Subsequently, an additional layer of a biaxially oriented polymeric material 318 has been applied, and further protective laminates 320 have been applied as an overlay on each side of the article.

Since the diffractive optical microstructure 312 is formed prior to the application of further layers, the supporting layer 316 may be formed from stiffer materials that are more suitable for forming identity cards, credit cards, or the like, but which are not transparent to the wavelength of laser light used to ablate the selected portions of the opacifying layer 302. For example, supporting layer 316 may be a polyethylene/polyester coextrusion, which is not transparent to light having a wavelength of 248 nm. It will, of course, be appreciated that all of the layers of the completed article must be transparent to visible light to enable the diffractive structure 312 to project a visible image onto a suitable viewing surface by passing visible light through the ablated portions.

It will be appreciated that a security document or other article made in accordance with a preferred embodiment of the invention has the advantages of being difficult to falsify, and being resistant to attempts to tamper with the diffractive optical structure formed therein. For example, any attempt to fraudulently alter the diffractive structure will typically result in the destruction of, or damage to, the structure.

It will also be appreciated that various modifications and/or alterations that would be apparent to a person of skill in the art may be made without departing from the scope of the invention. For example, while the method has been described in preferred embodiments as involving the application of laser radiation directed onto an opacifying layer from the side of a transparent substrate opposed to the side upon which the opacifying layer is applied, it will be appreciated that a diffractive optical microstructure may be formed by directing laser radiation onto selected portions of the opacifying layer directly, without passing through the transparent substrate.

The invention claimed is:

1. A method of producing a security document or device comprising a substrate and an optically diffractive device, the method comprising the steps of:
   applying a coating to an area of a surface on at least one side of the substrate; and
   irradiating an area of the coating with a patterned laser beam bearing the pattern of a desired diffractive device to ablate selected portions of the coating and thereby form an optically diffractive structure in said coating,
   wherein the substrate comprises a transparent plastic film and the coating comprises a transparent coating, in the absence of a reflective or opacifying layer at least during said step of irradiating,
   wherein said step of irradiating comprises directly exposing the coating to said patterned laser beam at a surface thereof so that at least one portion of the transparent coating is ablated its full thickness without ablating the substrate, and wherein laser ablation of the transparent coating with the patterned laser beam forms a diffractive microstructure in the transparent coating which is encoded with complex data, and the resulting optically diffractive device is a numerical-type diffractive optical element.

2. A method of producing a security document or device according to claim 1, the method further comprising the step of:

placing a mask in the path of laser radiation to create said patterned laser beam bearing the pattern of the desired diffractive device.

3. A method of producing a security document or device according to claim 2 wherein the mask is Fourier-encoded with the complex data required to form the numerical-type diffractive optical element.

4. A method of producing a security document or device according to claim 1 further comprising a subsequent step of applying a reflective coating to the transparent coating.

5. A method of producing a security document or device according to claim 4 wherein the reflective coating is formed from polymeric material containing metallic pigment particles.

6. A method of producing a security document or device according to claim 1 further comprising a subsequent step of applying a transparent layer to the transparent coating.

7. A method of producing a security document or device according to claim 1, the method further comprising the step of:

applying at least one opacifying layer to the substrate, said at least one opacifying layer only partly covering a surface of the substrate to leave at least said optically diffractive device uncovered by said opacifying layer.

* * * * *